Figure 1:
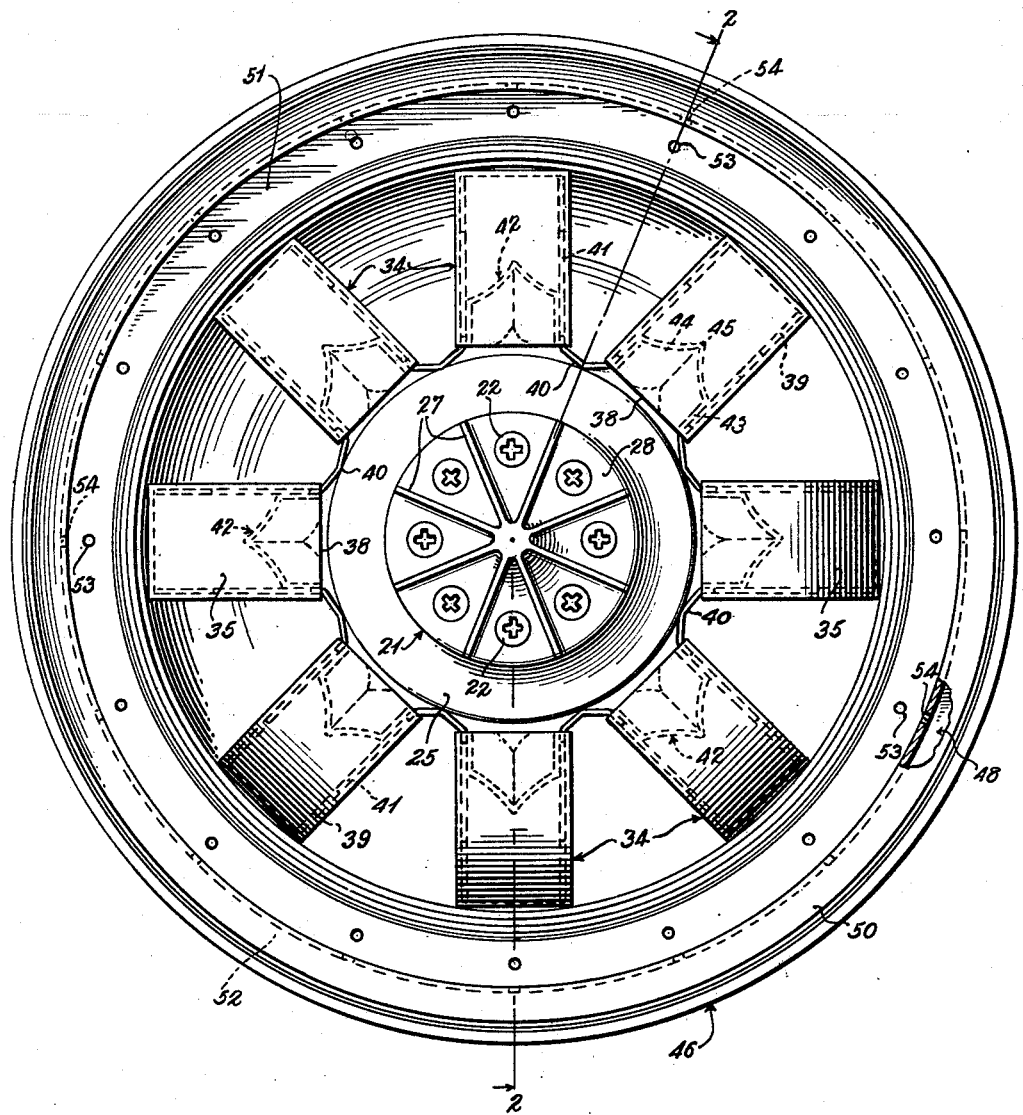

June 27, 1944.   L. D. MYERS   2,352,399
FIRE EXTINGUISHING METHOD AND APPARATUS
Filed June 26, 1943   2 Sheets-Sheet 1

Inventor
Leonard D. Myers

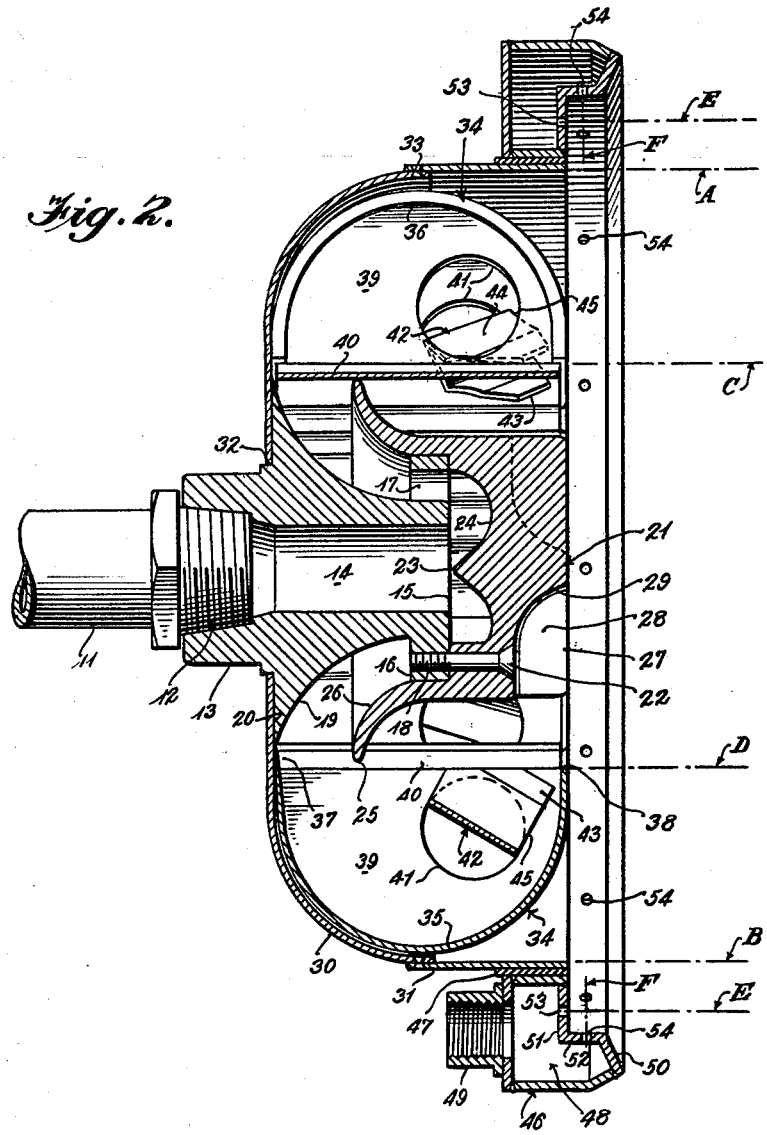

Patented June 27, 1944

2,352,399

UNITED STATES PATENT OFFICE 2,352,399

FIRE EXTINGUISHING METHOD AND APPARATUS

Leonard D. Myers, Washington, D. C., assignor to Cardox Corporation, Chicago, Ill., a corporation of Illinois Application June 26, 1943, Serial No. 492,458

20 Claims. (Cl. 169—11)

This invention relates to a method of extinguishing fires by means of an improved form of fire extinguishing medium and apparatus for carrying out said method.

Patent No. 2,248,270, issued to Eric Geertz, on July 8, 1941, describes and broadly claims the method of extinguishing fires by means of a mixture of water and carbon dioxide snow and vapor. In carrying out the method of this patent, liquid carbon dioxide is permitted to expand suddenly to effect its conversion to a mixture of snow and vapor. This conversion takes place in an applicator or nozzle which forms the snow and vapor mixture into a stream that can be directed to the seat of a fire. This discharged mixture of snow and vapor has a three-directional effect for it travels around corners and into all accessible cracks and crevices. The water is added to the snow and vapor mixture by directing one or more streams of water radially inwardly into the formed carbon dioxide stream in such a way and in such proportions that the water stream or streams will be broken up or finely atomized by the velocity of the carbon dioxide snow and vapor stream and substantially all of the resultant water droplets will be entrained by the carbon dioxide stream, with the result that the ultimate discharge possesses the three-directional effect of an ordinary carbon dioxide snow and vapor discharge. Additionally, the extremely low temperature of the carbon dioxide results in freezing of water droplets so that the extinguishing medium applied to the fire is actually carbon dioxide snow and vapor mixed with water in fluid droplet and ice particle form.

It now has been determined that substantial improvements can be made in this combined carbon dioxide and water extinguishing medium with reference to its carrying range and penetrating capacity, and its ability to more quickly extinguish fires and cool the materials being consumed, as well as associated heat absorbing masses, to a temperature below that at which the combustible materials will rekindle or reflash. These improvements are accomplished as a direct result of delivering the water to the carbon dioxide stream as completely preformed water fog instead of in solid streams.

The carrying range and pentrating capacity of a stream of any fire extinguishing medium are dependent upon the energy possessed by the said stream. The energy of any moving body is equal to one-half the product of the mass of the body times the square of its velocity. When we consider that the discharged stream of carbon dioxide and water, of the aforesaid Geertz patented method, is made up of a mixture of snow particles, water-ice particles, water droplets and carbon dioxide vapor, and that the snow and water-ice particles are many times more dense, or possess much greater mass per unit of volume, than the carbon dioxide vapor, it will be appreciated that the percentage of snow and water-ice particles has a very direct bearing on the energy of the discharge for any given velocity value.

Careful studies and comparisons of the mixed carbon dioxide and water discharges provided by delivering solid streams of water to a carbon dioxide snow and vapor stream and by delivering completely preformed water fog to a carbon dioxide snow and vapor stream have disclosed the following new characteristics for the final discharge stream of carbon dioxide and water fog which are responsible for the improvements in its carrying range and penetrating capacity:

1. Water fog produced by the direct impingement of two or more solid streams of water converging at a proper angle consists of a spray or mist in which all of the droplets are very small and are of uniform size. Atomized water produced by the impingement of a solid stream of water and a stream of carbon dioxide snow and vapor consists of droplets of non-uniform size and only a portion of which are as small as the droplets of the water fog.

2. When the water is delivered to the carbon dioxide stream as preformed water fog, the carbon dioxide stream is only required to entrain the water droplets. When the water is delivered to the carbon dioxide stream in the form of one or more solid streams, the carbon dioxide stream is called upon to atomize the water and to then entrain the resultant droplets. This additional work required of the carbon dioxide stream naturally results in the expenditure of some of its original energy.

3. The smaller and more uniform the size of the water droplets, the more easily they can be entrained by the carbon dioxide stream and the higher the percentage of water that can be carried by the carbon dioxide without destroying the three-directional effect of the final discharge.

4. The smaller the size of the water droplets the more readily they are frozen by the low temperature of the carbon dioxide and, therefore, the higher the percentage of water-ice particles in the final discharge.

The aforesaid studies and comparisons also have disclosed the following new characteristics which are responsible for the improved ability of the carbon dioxide and water fog discharge to more quickly extinguish fires and cool the material being consumed, as well as associated heat absorbing masses, to a temperature that is below the rekindling temperature of the combustible materials:

1. The effectiveness of the combined carbon dioxide and water discharge in extinguishing fires and preventing reflash is dependent to a large extent upon the ability of the medium to absorb heat from the combustible materials and the associated heat absorbing masses. As the total cooling effect of the combined carbon dioxide and water discharge is represented by the heat units that are required to sublime the carbon dioxide snow, to convert the water-ice to water, to raise the temperature of all of the water to the boiling point, and to evaporate all of the water; and as it requires more heat units to convert either a pound of water-ice to water or a pound of water to steam than to sublime a pound of carbon dioxide snow, it becomes obvious that the final discharge that is formed by combining preformed water fog with the carbon dioxide snow and vapor stream possesses a considerably greater cooling effect than the final discharge that is formed by combining solid streams of water with a carbon dioxide snow and vapor stream, and this greater cooling effect, of course, is due to the higher percentage of water fog that can be entrained by the carbon dioxide stream.

2. The small, uniformly sized water-ice particles of water fog apparently have a pronounced tendency, while flowing in the final combined stream, to fuse with the carbon dioxide snow particles and to cause separate snow particles to be bounded together to form more stable snow-ice flakes. In any event, this action appears to be the most logical explanation for the more firm, dry and dense character of the snow and ice deposit that remains on the surfaces of cooled objects, etc., against which the extinguishing medium has been applied. These more stable snow-ice flakes disintegrate at a slower rate and thereby provide a very desirable prolonged cooling action.

It is a primary object of this invention to provide a method of forming an improved carbon dioxide and water fire extinguishing medium and apparatus for carrying out said method.

A further important object of the invention is the provision of a method of producing an improved fire extinguishing medium by combining preformed water fog with carbon dioxide snow and vapor to form a composite discharge which possesses an extremely high cooling effect and which provides exceptional carrying range and penetrating capacity while retaining the three-directional discharge characteristic of an ordinary carbon dioxide discharge.

Another object of the invention is the provision of fire extinguishing discharge apparatus which is capable of producing the same shape of discharge pattern, or stream cross section, while discharging either a combination of water and carbon dioxide snow and vapor; a combination of carbon dioxide snow and vapor; or merely water fog.

Still another object of the invention is to provide a method of and apparatus for extinguishing fires by means of a discharge stream of carbon dioxide and water, and in which the stream takes the form of a compact, dense core of carbon dioxide snow with water-ice particles entrained therein and surrounded by or enclosed in a carbon dioxide vapor tube or envelope with water droplets and water-ice particles entrained therein.

Other objects and advantages of the invention will be apparent during the course of the following description.

In the accompanying drawings forming a part of this specification and in which like numerals are employed to designate like parts throughout the same, Figure 1 is a front elevational view of a fire extinguisher discharge apparatus embodying this invention, and Figure 2 is a transverse sectional view taken on line 2—2 of Fig. 1.

In the drawings, wherein for the purpose of illustration is shown the preferred embodiment of this invention, the fire extinguisher discharge apparatus consists of a carbon dioxide discharge nozzle of the type disclosed and broadly claimed in the application of Hilding V. Williamson, Serial No. 425,568, filed January 3, 1942, with a water fog producing ring operatively associated with the periphery thereof. Although this particular structural combination posssses numerous new and novel advantages over all prior known discharge structures, it is to be understood that the broad method of combining preformed water fog with a carbon dioxide discharge is not limited to the use of this particular structural combination.

Referring to the two figures of the drawings, the reference character 11 designates a pipe that supplies liquid carbon dioxide to the discharge apparatus. This pipe may be considered as representative of either a "play-pipe" which is attached to the outer end of a fire hose and used in handling the discharge apparatus, or a branch supply pipe which forms a part of a "fixed system." The threaded end 12 of the pipe is connected to the stem or shank 13 which is provided with a bore 14 for delivering the liquid carbon dioxide to the interior of the body of the discharge apparatus. The outer end 15 of this bore communicates with the interior of a deflector element and cooperates with this element to form a flow path for the liquid carbon dioxide. The stem or shank 13 has formed on its outer end a radially extending flange 16 which is formed with a circular series of orifices 17 through which the liquid carbon dioxide is released to permit sudden expansion so that its pressure will drop below 75 pounds per square inch, absolute, which will cause a certain percentage of the liquid to flash to snow while the remainder of the liquid is vaporized. This annular flange 16 is further provided with a circular series of threaded openings 18, for a purpose to be explained at a later point. Exteriorly, the stem or shank 13 is provided with a rearwardly curved or flared surface 19 that terminates in a shoulder 20.

The deflector element referred to above is identified by the reference character 21 in the two figures. This element is secured to the flange 16 by means of the series of screws 22 that are threaded into the holes 18 of the flange 16. The deflector is partially hollowed out so as to control the direction of flow of the liquid carbon dioxide to the discharge orifices 17. For this purpose, the interior of the deflector is provided with a conically shaped projection 23 that is axially aligned with the bore 14 of the shank or stem. The interior of the deflector element 21, radially outwardly of the spreading projection 23, is provided with the curved surfaces 24 that function to change the direction of flow of the liquid carbon dioxide so that it will be directed rearwardly through the discharge orifices 17. The inner or rear portion of the deflector 21 is belled or curved outwardly at 25 to form an internal curved surface 26 that lies opposite to and cooperates with the curved exterior surface 19 of the stem or shank 13. Fig. 2 clearly shows that these two cooperating surfaces 19 and 26 diverge with respect to each other in any radial section to form an annular passageway that gradually increases in depth or thickness. This increase functions to permit further expansion of the released carbon dioxide so that the pressure of the same will drop still further and provide for flashing of whatever liquid may remain as a part of the flowing material. The outer portion of the deflector element 21 is illustrated in the two figures as being formed with radial ribs 27 which form the valleys 28 having curved inner surfaces 29 which will function to deflect forwardly or axially any of the discharged medium which comes in contact with the same.

The deflector element 21 and the cooperating portion of the stem or shank 13 are enclosed within a chambered body or casing which is formed by the inner portion 30 and the outer portion 31. The inner portion 30 of the body or casing is dish shaped and is centrally cut away at 32 to permit the inner portion of the stem or shank 13 to pass therethrough so that the shoulder 20 of the shank or stem will act as a seat or an abutment for this inner portion 30 of the body or casing. Any suitable means may be provided for securing the body or casing portion 30 to the shoulder portion 20 of the stem or shank, such as by welding or the use of suitable screws. The outer portion 31 of the body or casing is of cylindrical shape and its inner edge portion overlaps or is telescoped with respect to the outer marginal edge portion of the inner body part 30 to provide a lapped joint 33. Welding or the like may be employed for rendering this joint permanent. The two figures of the drawings clearly show that the body or casing of the discharge apparatus cooperates with the stem or shank 13 to provide a closed rear wall while leaving the front of the apparatus entirely open. The body or casing additionally cooperates with the stem or shank 13 and the deflector 21 to form an annular chamber for receiving the circular series of flow controlling and directing units 34.

These units 34 are equally spaced around and extend radially of the stem or shank 13 and the deflector element 21. Each one of these units includes a semi-circular or semi-cylindrical band 35 which is flanged at both of its longitudinal edges 36, see Fig. 2. The inner transverse edge 37 of each one of these bands is suitably anchored either in close proximity to or in contact with the periphery of the flared portion or surface 19 of the stem or shank 13. The outer edge 38 of each one of these bands 35 terminates in the plane of the outer face of the body or casing portion 31 and the outer edges of the deflector element ribs 27.

The opposite sides of each one of these units 34 are formed by wall members 39 which lie inside of the edge flanges 36 and are suitably secured thereto. The two figures of the drawings show that the opposed side walls of each adjacent pair of units 34 are formed by a single piece of sheet material with the center or intermediate portion of each one of these side wall forming pieces designated by the reference character 40. These center or intermediate portions 40 function to bridge the gaps or spaces left between the inner edges or sides of adjacent units 34.

Fig. 2 clearly discloses the side walls 39 of the several units 34 as having apertures 41 formed therein. These apertures are formed in the outer or front halves of the side walls 39; i. e., relatively close to the outer edges 38 of the bands 35. Each flow controlling and deflecting unit 34 has mounted within the same a plow-shaped deflecting and separating element 42. These elements are of V or wedge shape in section with securing flanges 43 formed at the sides thereof for securing, such as by welding, the elements in their proper places within the units 34. Fig. 2 discloses these deflecting and separating elements as being arranged with respect to the side wall openings or apertures 41 so that the laterally sloping surfaces 44 of each element will split or spread any material flowing through the interior of a unit 34 so that this material will be deflected through the cooperating side wall openings or apertures 41. These elements 42 are shown in Fig. 2 as being arranged so that their outer transverse edges 45 are spaced from the inner surfaces of the outer end portions of their associated bands 35. In other words, a space or gap is left between the inner surface of the band 35 of each unit 34 and the outer edge 45 of its associated deflecting and separating element 42 through which the extinguishing medium may flow to the outer edge 38 of the band 35.

The mode of operation of the carbon dioxide discharge apparatus described above is explained in detail in the aforesaid Hilding V. Williamson application and for that reason its mode of operation will be more generally set forth herein. Liquid carbon dioxide, at any desired pressure and temperature will be delivered to the bore of the shank or stem 13 and will flow as a liquid to the discharge orifices 17. As the liquid carbon dioxide leaves these orifices, it expands suddenly and drops in pressure to such an extent that it flashes and vaporizes. The carbon dioxide that enters the space formed between the outwardly flared surfaces 19 and 26, therefore, takes the form of a mixture of snow and vapor. Depending upon the temperature of the liquid carbon dioxide that is delivered to this discharge apparatus, a certain percentage of the same will flash into snow as a result of the self-cooling action that is produced. In other words, the entire discharge from the peripheral mouth, formed by the outer edges of the surfaces 19 and 26, will consist of a mixture of snow and vapors.

This snow and vapor mixture, as it leaves the aforesaid peripheral mouth, will be flowing in a truly radial direction. Some portions of the mixture will pass directly into the various flow controlling and directing units 34. The remainder of the mixture will be split and deflected laterally in opposite directions by the axially extending portions 40 of the side wall forming pieces 39. These deflected portions of the mixture, therefore, will be directed into the several units 34.

The flow controlling and directing units 34; i. e., their curved outer bands 35, will deflect the flowing mixture from its straight line, radial path and convert the radial flow of the same into a curvilinear flow or motion. As the carbon dioxide snow of the mixture is many times more dense than the carbon dioxide vapor, and as the velocity of both of these components is the same, the snow offers more resistance to the deflecting force exerted by the obstructing, curved bands 35 with the result that the snow will be moved to the outer side of each one of the curvilinear flow paths for the material. The snow, in seeking this outer portion of each path, will crowd or force the vapor inwardly away from the inner surfaces of the various bands 35. The difference in density of the snow, as compared to the vapor, therefore, effects a segregation of these two components. The snow is segregated at or close to the outer side of each one of the curvilinear paths and the vapor is segregated on the inner side of each path.

As the segregated snow and vapor reach the outer side of each one of the flow controlling and directing units 34, the snow passes through the gap or space left between the inner surface of its band 35 and the outer edge of its flow splitting and separating element 42. The inwardly positioned, segregated vapor, however, strikes the sloping surfaces 44 of the various elements 42 and is directed laterally through the side wall apertures 41 into the portions of the body or casing which lie between adjacent units 34. This segregated and separated snow passes radially outwardly beyond the edges 36 of the several bands 35 and is directed into the valleys 28 of the deflector element 21. The curved inner surfaces 29 of these valleys deflect the snow so that it will flow or will be discharged to the atmosphere in an axial direction with respect to the entire apparatus. This discharge of all of the separated snow from all of the units 34 causes the same to be assembled into a compact, dense stream. The separated vapors will leave the spaces between the adjacent units 34 and will flow in an axial direction relative to the discharge apparatus. The vapor is in this way discharged outwardly of the dense snow stream. Because the areas of discharge for the vapor are spaced distances equal to the widths of the flow controlling and directing units 34, the vapor discharges will be separated from each other immediately adjacent the front face of the apparatus. However, the vapor discharges will blend together a short distance in advance of the apparatus and will form a surrounding or enclosing vapor tube or envelope for the compact, dense snow stream which forms the core of the composite discharge.

From this description of the mode of operation of the discharge apparatus for the carbon dioxide, it will be appreciated that there is provided a discharge stream which is of substantially circular shape in transverse section. In Fig. 2 of the drawings, the dotted lines A and B are intended to represent the peripheral margins of this stream on the section of this figure. The dotted lines C and D are intended to illustrate the peripheral margins of the compact, dense snow core. Therefore, the margins of the vapor tube or envelope are represented by the dotted lines A—C and B—D.

The water fog producing apparatus consists of the hollow ring 46 that surrounds the outer edge portion of the body or casing part 31. Any suitable means may be employed for properly attaching this ring to the body or casing and a band of any suitable heat insulating material of any suitable thickness may be provided at 47 to insulate the water in the interior 48 of the ring from the low temperature of the body or casing part 31. Water is supplied to the interior 48 of the ring by a hose, or the like, not shown, which is to be connected to the internally threaded coupling 49. The ring 46 is provided with a front wall 50 that is formed with the two annular, angularly arranged portions 51 and 52. Each one of these wall portions 51 and 52 is provided with an annular series of apertures which may be of any size or diameter desired. The apertures for the wall portion 51 are designated by the reference character 53 while the apertures for the wall portion 52 are designated by the reference character 54. Each one of the apertures 53 is arranged in the same radial plane as an aperture 54 so that the axes of the several apertures 53 are angularly arranged with the axes of the apertures 54. The angle formed by the axes of the associated, or radially aligned, apertures 53 and 54 is represented by the dotted lines E and F, respectively. As a solid stream of water will be discharged through each one of the apertures 53 and 54, the water streams from each associated, radially aligned pair of apertures 53 and 54 will impinge against each other with the result that the water of both streams will be broken up into a fog which is formed of very fine droplets of uniform size. This water fog or mist will fill to a substantially uniform density all portions of the space lying between the angle lines E and F outwardly of the zone of impingement of the two streams discharged from the apertures 53 and 54. It will be seen by inspecting Fig. 2 that the angle line E is arranged substantially in parallelism with the dotted line A that is intended to represent the peripheral margin of the carbon dioxide discharge stream while the angle line F is normal to this carbon dioxide margin line A. Therefore, a substantial portion of the water fog produced by each set or pair of apertures 53 and 54 will be directed inwardly into the path of the carbon dioxide stream while the remainder of the water fog will travel a path that parallels the path of flow of the carbon dioxide. By inspecting Fig. 1, it will be seen that each one of the carbon dioxide vapor discharging spaces, which is located between each adjacent pair of units 34, has radially outwardly aligned therewith a pair of water fog producing apertures 53 and 54 while each one of the units 34 has radially aligned therewith a pair or set of water fog producing apertures 53 and 54. Therefore, each discharge of carbon dioxide vapor is individually associated with a discharge of water fog with the result that each discharge of carbon dioxide vapor will be responsible for entraining its individual portion of the generated water fog. Also, as each one of the flow controlling and directing units 34 produces an initial gap or blank area in the discharge of carbon dioxide vapor, the water fog generated by the set or pair of apertures 53 and 54 which is radially aligned with each unit 34 will be permitted to fill the gap occurring between adjacent vapor discharges and the water fog that is generated in radial alignment with each one of the units 34 will be given an opportunity to be entrained in part by the dense snow stream and in part by the two vapor discharges between which it is interposed. It will be seen, therefore, that the water droplets of the generated water fog will be entrained both by the dense carbon dioxide snow core and the encircling carbon dioxide vapor. All of the water droplets of the fog that are entrained by the dense snow core will be quickly frozen to water-ice while most if not all of the water droplets of the fog that are entrained by the carbon dioxide snow tube or envelope also will be frozen to water-ice particles.

In fighting fires with this type of discharge apparatus, there will be occasions when a pure water fog discharge or a pure carbon dioxide discharge will be preferred to a combined carbon dioxide and water fog discharge. By employing separate control valves in the supply lines to the carbon dioxide discharge apparatus and the water fog generating ring, the flow of liquid carbon dioxide and water can be controlled as desired. However, regardless of whether the discharge is a combination of carbon dioxide and water, or of pure carbon dioxide, or of pure water fog, the cross sectional shape or pattern of the discharge will be of the same circular formation. It will be appreciated, however, that the carrying range of a pure water fog discharge will be very much less than the carrying range of either a combined carbon dioxide and water fog discharge or a pure carbon dioxide discharge. This is due to the fact that the water fog discharge inherently possesses a low velocity due to the small or fine water droplets that make up the same.

It will be appreciated that either the sets or pairs of apertures 53 and 54 which are in radial alignment with the carbon dioxide vapor discharge spaces, or the sets or pairs of apertures 53 and 54 which are in radial alignment with the flow controlling or directing units 34, may be omitted if desired and the character of the final discharge modified accordingly. For example, if the apertures in radial alignment with the vapor discharge spaces are all that are employed, very little, if any, of the water fog will be entrained by the dense carbon dioxide snow core. The final discharge stream then would consist of a dense carbon dioxide snow core enclosed in a combined carbon dioxide vapor and water fog tube or envelop.

It is to be understood that the form of this invention herewith shown and described is to be taken as a preferred example of the same, and that various changes in the shape, size, and arrangement of structural parts and modifications of the method may be resorted to without departing from the spirit of the invention or the scope of the subjoined claims.

Having thus described the invention, I claim:

1. A method of discharging a fire extinguishing medium, comprising conducting liquid carbon dioxide to a region of release, permitting sudden expansion of the liquid to produce snow and vapor, projecting the snow and vapor into the atmosphere in the form of a stream, separately generating water fog, and so associating the generated water fog with the carbon dioxide stream that water fog will be entrained and carried to the point of application by the carbon dioxide stream.

2. A method of discharging a fire extinguishing medium, comprising conducting liquid carbon dioxide to a region of release, permitting sudden expansion of the liquid to produce snow and vapor, projecting the snow and vapor into the atmosphere in the form of a stream, generating water fog by the impingement of streams of water, and so associating the generated water fog with the carbon dioxide stream that water fog will be entrained and carried to the point of application by the carbon dioxide stream.

3. A method of discharging a fire extinguishing medium, comprising conducting liquid carbon dioxide to a region of release, permitting sudden expansion of the liquid to produce snow and vapor, projecting the snow and vapor into the atmosphere in the form of a stream, generating water fog at a plurality of points arranged radially outwardly of the carbon dioxide stream, and so projecting the water fog at all of said points that it will be entrained by and carried to the point of application by the carbon dioxide stream.

4. A method of discharging a fire extinguishing medium, comprising conducting liquid carbon dioxide to a region of release, permitting sudden expansion of the liquid to produce snow and vapor, projecting the snow and vapor into the atmosphere in the form of a stream, generating water fog by the impingement of streams of water at a plurality of points arranged radially outwardly of the carbon dioxide stream, and so projecting the water fog at all of said points that it will be entrained and carried to the point of application by the carbon dioxide stream.

5. A method of discharging a fire extinguishing medium, comprising conducting liquid carbon dioxide to a region of release, permitting sudden expansion of the liquid to produce snow and vapor, projecting the snow and vapor into the atmosphere in the form of a stream, separately generating water fog at a plurality of points in close proximity to the formed stream of carbon dioxide, and so projecting the water fog at all of said points that it will be entrained and carried to the point of application by the carbon dioxide stream.

6. A method of discharging a fire extinguishing medium, comprising effecting sudden release of liquid carbon dioxide to lower its pressure sufficiently to form a mixture of snow and vapor, effecting separation of the snow and vapor from each other, forming the separated snow and vapor into a composite discharge stream, separately generating water fog, and so projecting the water fog that it will be entrained by and carried to the point of application by the carbon dioxide stream.

7. A method of discharging a fire extinguishing medium, comprising effecting sudden release of liquid carbon dioxide to lower its pressure sufficiently to form a mixture of snow and vapor, effecting separation of the snow and vapor from each other, forming the separated snow and vapor into a composite discharge stream with the vapor shielding the snow from the surrounding atmosphere, separately generating water fog, and so projecting the water fog that it will be entrained by and carried to the point of application by the carbon dioxide stream.

8. A method of discharging a fire extinguishing medium, comprising effecting sudden release of liquid carbon dioxide to lower its pressure sufficiently to form a mixture of snow and vapor, effecting separation of the snow and vapor from each other, forming the separated snow and vapor into a composite discharge stream, generating water fog at a plurality of points arranged radially outwardly of the carbon dioxide stream, and so projecting the water fog at all of said points that it will be entrained by and carried to the point of application by the carbon dioxide stream.

9. A method of discharging a fire extinguishing medium, comprising effecting sudden release of liquid carbon dioxide to lower its pressure sufficiently to form a mixture of snow and vapor, effecting separation of the snow and vapor from each other, forming the separated snow and vapor into a composite discharge stream with the vapor shielding the snow from the surrounding atmosphere, generating water fog at a plurality of points arranged radially outwardly of the carbon dioxide stream, and so projecting the water fog at all of said points that it will be entrained by and carried to the point of application by the carbon dioxide stream.

10. A method of discharging a fire extinguishing medium, comprising effecting sudden release of liquid carbon dioxide to lower its pressure sufficiently to form a mixture of snow and vapor, effecting separation of the snow and vapor from each other, forming the separated snow and vapor into a composite discharge stream with the vapor shielding the snow from the surrounding atmosphere, separately generating water fog, and so projecting the water fog that it will be entrained by the vapor portion of the composite discharge stream.

11. A method of discharging a fire extinguishing medium, comprising conducting liquid carbon dioxide to a region of release, permitting sudden expansion of the liquid to produce a mixture of snow and vapor, deflecting the flowing mixture to effect a departure from its normal straight line path of movement, continuing the deflection of the moving mixture until the difference in the density of the snow and the vapor effects a substantial segregation of these components into different portions of the flow, discharging the carbon dioxide to the atmosphere with the segregated snow emerging in a single dense stream and with the segregated vapor emerging as several streams spaced around the snow stream but adapted to merge to surround the snow stream, generating water fog at a plurality of points arranged radially of the path of the carbon dioxide discharge, so projecting water fog at certain of said plurality of points that it will pass through the spaces formed between the vapor streams to be entrained by the dense snow stream, and so projecting the remainder of the water fog that it will be entrained by the vapor stream.

12. A method of discharging a fire extinguishing medium, comprising conducting liquid carbon dioxide to a region of release, permitting sudden expansion of the liquid to produce a mixture of snow and vapor, deflecting the flowing mixture to effect a departure from its normal straight line path of movement, continuing the deflection of the moving mixture until the difference in the density of the snow and the vapor effects a substantial segregation of these components into different portions of the flow, discharging the carbon dioxide to the atmosphere in its thus separated condition, separately generating water fog, and so projecting the water fog that it will be entrained by and carried to the point of application by the carbon dioxide stream.

13. A method of discharging a fire extinguishing medium, comprising conducting liquid carbon dioxide to a region of release, permitting sudden expansion of the liquid to produce snow and vapor, projecting the snow and vapor into the atmosphere in the form of a stream, separately generating water fog, and so projecting the generated water fog into the normal flow path of the carbon dioxide stream that the water fog would form a stream of the same cross sectional shape as the carbon dioxide stream if the latter stream were to cease flowing.

14. A method of discharging a fire extinguishing medium, comprising effecting sudden release of liquid carbon dioxide to lower its pressure sufficiently to form a mixture of snow and vapor, effecting separation of the snow and vapor, forming the separated snow and vapor into a composite discharge stream, separately generating water fog, and so projecting the generated water fog into the normal flow path of the carbon dioxide stream that the water fog would form a stream of the same cross sectional shape as the carbon dioxide stream if the latter stream were to cease flowing.

15. Fire extinguishing apparatus, comprising a hollow body, means for releasing liquid carbon dioxide into said body to permit it to suddenly expand to form carbon dioxide snow and vapor, means in the hollow body to effect discharge of the snow and vapor to the atmosphere as a stream, and means for generating water fog and projecting it into the flow path of the carbon dioxide stream for entrainment thereby.

16. Fire extinguishing apparatus, comprising a hollow body through which a mixture of carbon dioxide snow and vapor passes, means within the body for separating snow and vapor from each other while passing therethrough and for discharging the same to the atmosphere with the vapor shielding the snow from the surrounding atmosphere, and means for separately generating water fog and projecting it into the flow path of the carbon dioxide stream for entrainment thereby.

17. Fire extinguishing apparatus, comprising a hollow body, means for releasing liquid carbon dioxide into said body to permit it to suddenly expand to form snow and vapor, means in the hollow body to effect discharge of the snow and vapor to the atmosphere as a stream, and a water fog generating ring surrounding the hollow body for projecting water fog into the flow path of the carbon dioxide stream for entrainment thereby.

18. Fire extinguishing apparatus, comprising a hollow body through which a mixture of carbon dioxide snow and vapor passes, means within the body for separating snow and vapor from each other while passing therethrough and for discharging the same to the atmosphere with the vapor shielding the snow from the surrounding atmosphere, and a water fog generating ring surrounding the hollow body for projecting water fog into the flow path of the carbon dioxide stream for entrainment thereby.

19. Fire extinguishing apparatus, comprising a hollow body, means for releasing liquid carbon dioxide into said body to permit it to suddenly expand to form snow and vapor, means in the hollow body to effect discharge of the snow and vapor to the atmosphere as a stream of a prescribed cross sectional shape, and means attached to the hollow body for generating water fog, said generating means being so constructed and arranged as to be capable of projecting the water fog as a stream of the same cross sectional shape as and to fill the flow path of the carbon dioxide stream.

20. Fire extinguishing apparatus, comprising means for effecting the production of snow and vapor from liquid carbon dioxide and discharging the snow and vapor to the atmosphere as a stream, and means for generating water fog and projecting it into the path of the carbon dioxide stream for entrainment thereby.

LEONARD D. MYERS.